United States Patent [19]
Gelbien et al.

[11] Patent Number: 5,940,260
[45] Date of Patent: *Aug. 17, 1999

[54] APPARATUS AND METHOD FOR DISTRIBUTING ELECTRICAL POWER

[76] Inventors: Lawrence J. Gelbien, 41 Alice Rd., West Islip, N.Y. 11795; Philip B. Andreas, 1163 5th Ave., East Northport, N.Y. 11731; Werner J. Schweiger, 1 Cayuga Rd., East Patchogue, N.Y. 11772

[ * ] Notice: This patent is subject to a terminal disclaimer.

[21] Appl. No.: 08/995,696

[22] Filed: Dec. 22, 1997

Related U.S. Application Data

[63] Continuation of application No. 08/593,213, Jan. 29, 1996, Pat. No. 5,701,226, which is a continuation of application No. 08/164,905, Dec. 9, 1993, Pat. No. 5,513,061.

[51] Int. Cl.$^6$ ..................................................... H02H 3/00
[52] U.S. Cl. .................................. 361/62; 361/64; 361/65; 361/66; 361/115
[58] Field of Search .................................. 361/63, 65, 7, 361/62, 64, 66, 71, 72, 115

[56] References Cited

U.S. PATENT DOCUMENTS

| | | | |
|---|---|---|---|
| 4,302,750 | 11/1981 | Wadhwani et al. | 340/870.02 |
| 5,305,174 | 4/1994 | Morita et al. | 361/63 |
| 5,341,268 | 8/1994 | Ishiguro et al. | 361/62 |
| 5,513,061 | 4/1996 | Gelbien et al. | 361/63 |

*Primary Examiner*—Richard T. Elms
*Assistant Examiner*—Stephen W. Jackson
*Attorney, Agent, or Firm*—Dilworth & Barrese

[57] ABSTRACT

The present invention relates to an apparatus and method for distributing electrical power from power substation circuits. The apparatus of the present invention is responsive to overcurrent conditions and selectively actuates a switching network so as to restore power to at least a portion of the users connected to the faulty circuit of the power distribution system.

1 Claim, 9 Drawing Sheets

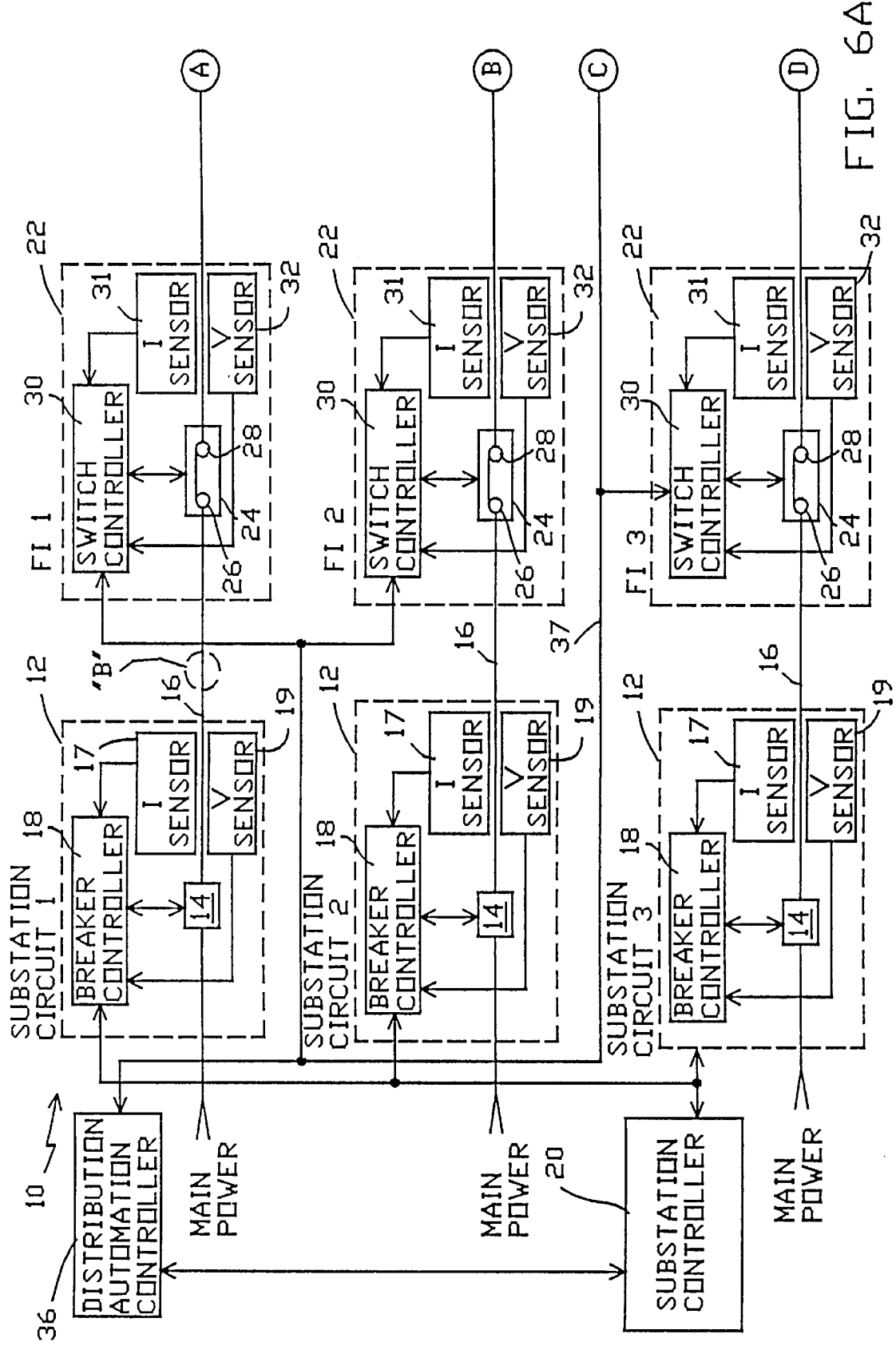

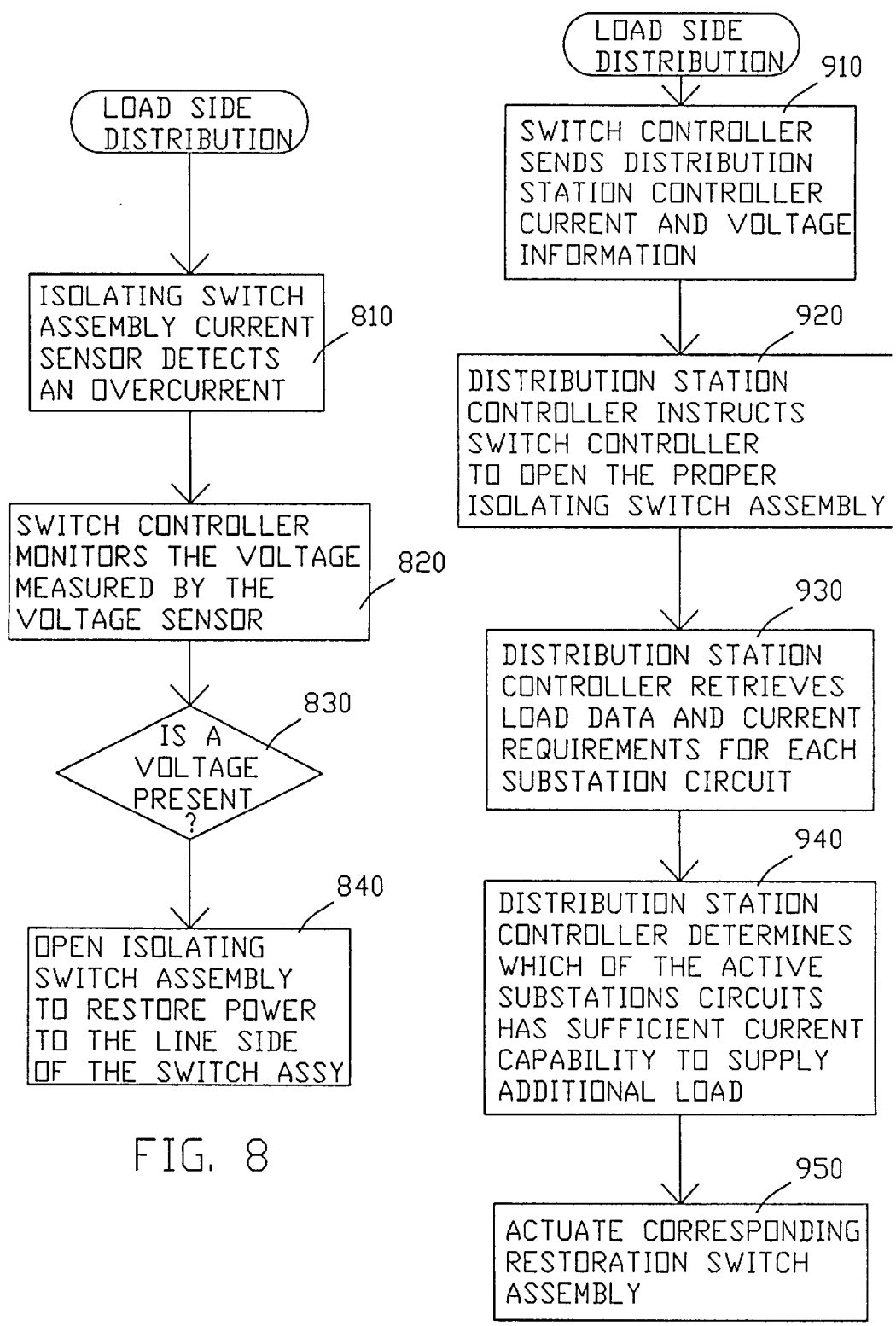

APPARATUS AND METHOD FOR DISTRIBUTING ELECTRICAL POWER

This is a continuation of copending application Ser. No. 08/593,213 filed Jan. 29, 1996 now U.S. Pat. No. 5,701,226, which is a continuation of application Ser. No. 08/164,905 filed Dec. 9, 1993, now U.S. Pat. No. 5,513,061, which are both incorporated herein by reference.

BACKGROUND OF THE INVENTION

1. Field of the Invention

The present invention relates to power distribution systems. More particularly, the present invention relates to an automated power distribution system which incorporates a switching network responsive to control signals to fault isolate overcurrent events and minimize power outages.

2. Description of the Related Art

Electrical power distribution systems generally comprise substations having multiple circuits which have the capability to distribute three-phase electrical power to residential and/or industrial locations. Approximately 1500 customers are typically connected to each circuit. Each phase of each circuit is protected from an overcurrent event by a circuit breaker which is typically located at the substation. Examples of an overcurrent event include lightning striking the electrical conductors creating a current surge on one or more feeder conductors of the circuit, animals on the feeder conductors which create a short circuit, and actual short circuits. When an overcurrent is detected by the substation circuit breaker, the breaker initially actuates an "instantaneous trip and close" of the circuit breaker switch.

As shown in the voltage waveform of FIG. 1, the instantaneous trip of the circuit breaker switch (i.e., the switch opens) occurs at time $t_1$, when the overcurrent (or fault) is detected. At time $t_2$, the circuit breaker switch closes in an attempt to correct the cause of the overcurrent. For example, if an animal is on the conductors causing a short circuit, the animal may be dislodged from the conductors when the breaker trips and is closed to turn power back on. In the event the overcurrent was instantaneous, e.g., caused by lightning, then power will be restored to the circuit when the breaker closes. Typically, the circuit breaker switch closes within about four and six cycles of detection of the overcurrent, i.e., time $t_2$ occurs between about 66 ms and about 100 ms after time $t_1$.

If the cause of the overcurrent is still present at the time the circuit breaker switch is closed, the circuit breaker switch again trips at time $t_3$. At this time the circuit breaker enters a "first time delay" mode wherein the circuit breaker switch trips for approximately 30 seconds. At time $t_4$ the breaker switch is again closed. If the cause of the overcurrent is still present, the circuit breaker switch again trips at time $t_5$ and the circuit breaker enters a "lockout" mode, wherein the cause of the overcurrent must be ascertained before the circuit breaker switch can be closed. In the above configuration, when the circuit breaker is in the lockout mode, every customer connected to the circuit is without electrical power. As a result, it is desirable to isolate the fault and restore power to as many customers as possible connected to the circuit in a relatively short period of time.

One attempt to restore power to customers on a circuit has been to install automatic circuit reclosure (ACR) switches on the utility poles which support the feeder conductors. The ACR switches operate in a similar fashion as the circuit breaker, i.e., the switch opens when an overcurrent is detected. However, the ACR switches have similar operating characteristics as the circuit breaker, thus operating characteristic mismatches often occur between the operation of the ACR switches and the circuit breakers. To illustrate, if an ACR switch and the circuit breaker are designed to trip at a current of 200 amps, and the sensitivity of the circuit breaker is greater than the sensitivity of the ACR switch, then an overcurrent on the conductors would cause the circuit breaker to trip before the ACR switch, thus, circumventing the intended purpose of installing ACR switches. Moreover, since ACR switches trip when current is flowing through the switch, they must be constructed to withstand the arcing and high temperatures which occur between the switch contacts when opening and closing. This construction increases the cost of each ACR switch, rendering them highly uneconomical for usage in large quantities as required to protect each phase of each substation circuit.

Another attempt to fault isolate the cause of the overcurrent is to install multiple normally closed switches in series in each circuit on the utility poles. When an overcurrent is detected by the circuit breaker, each switch is opened and the circuit breaker is then closed. If no overcurrent is detected then each of the switches is sequentially closed until the circuit breaker trips, thereby causing the entire circuit to lose power again and causing damage to the line conductors and associated electrical equipment by closing the breaker into faults.

Therefore, a need exists for a power distribution system which utilizes a switching network that operates when the circuit breaker opens to avoid the arcing and high temperature problems associated with the opening and closing of switches when current flows therethrough and which quickly isolates overcurrent faults and restores power to at least a portion of the customers connected to the circuit.

SUMMARY OF THE INVENTION

The present invention relates to an apparatus for distributing electrical power from power substation circuits. Typically, each substation circuit includes feeder conductors and a circuit breaker assembly located at the substation. The circuit breaker assembly is configured to trip when current flowing through the conductors exceeds a predetermined value, such as 725 amps.

The apparatus of the present invention includes at least one fault isolating switch member positionable in series with the feeder conductors of each substation circuit so as to define a line side and a load side. Current sensing means is operatively associated with the isolating switch member and is provided to measure the current on the load side of the isolating switch member. Isolating switch actuating means determines if the measured current value exceeds a predetermined value and selectively actuates the at least one isolating switch member when the predetermined value is exceeded. Preferably, the isolating switch actuating means has a predetermined time delay which corresponds with the tripping of the substation circuit breaker assembly before actuating the isolating switch member, thus, reducing the requirement of having a switch assembly which can withstand the arcing and high temperatures caused by the current flow. Each isolating switch member is preferably a normally closed switch member having a pair of electrical contacts connectable in series with the substation feeder conductors.

In the preferred embodiment, the isolating switch actuating means comprises a switch controller operatively connected to the isolating switch member and to the current and voltage sensing means so as to selectively move the isolating switch member between closed and open positions. The switch controller includes a microprocessor, memory and stored programs which receives the measured current and voltage values from the current and voltage sensing means and determines whether an overcurrent has occurred, a loss of voltage has occurred, and which controls the movement of the isolating switch member.

The isolating switch actuating means may further comprise a distribution station controller located remotely from the at least one isolating switch member. The distribution station controller is operatively connected to the switch controller and is configured to receive data from and transfer data to the switch controller. Preferably, the data transferred to the switch controller from the distribution station controller includes instructions for actuating the isolating switch member.

In an alternative embodiment, the apparatus of the present invention further comprises at least one restoration switch member connected between each of the substation circuits, and means for selectively actuating the at least one restoration switch member. The restoration switch actuating means actuates the restoration switch member when the substation circuit breaker is tripped and the measured current value does not exceed the predetermined current value. Each restoration switch member includes a normally open switch member having a pair of electrical contacts connected to conductors between each of the substation circuits which closes upon actuation.

The present invention also provides a method for distributing electrical power from power substation circuits. As noted above, each substation circuit includes feeder conductors which distribute the electrical power from the substation, and a circuit breaker assembly located at the substation which is configured to trip when current flowing through the conductors exceeds a predetermined value. The steps of the method includes positioning at least one fault isolating switch member and current sensing means in series with the feeder conductors of each substation circuit, measuring the value of current on a load side of the isolating switch member and determining if the current value exceeds the predetermined value, and actuating the isolating switch member a predetermined period of time after the measured current value at the switch member exceeds the predetermined value. Thus, the isolating switch member actuates when the substation circuit breaker is tripped.

The method of the present invention may also include the steps of positioning at least one restoration switch member between each of the substation circuits, and actuating the restoration switch member a predetermined period of time after the substation circuit breaker has tripped and the measured current value has not exceeded the predetermined value.

BRIEF DESCRIPTION OF THE DRAWINGS

The preferred embodiments of the invention are described hereinbelow with reference to the drawings wherein:

FIGS. 7, 8 and 9 are flow chart diagrams for the operation of the distribution system of FIG. 2.

DETAILED DESCRIPTION OF THE PREFERRED EMBODIMENTS

Figure 1:
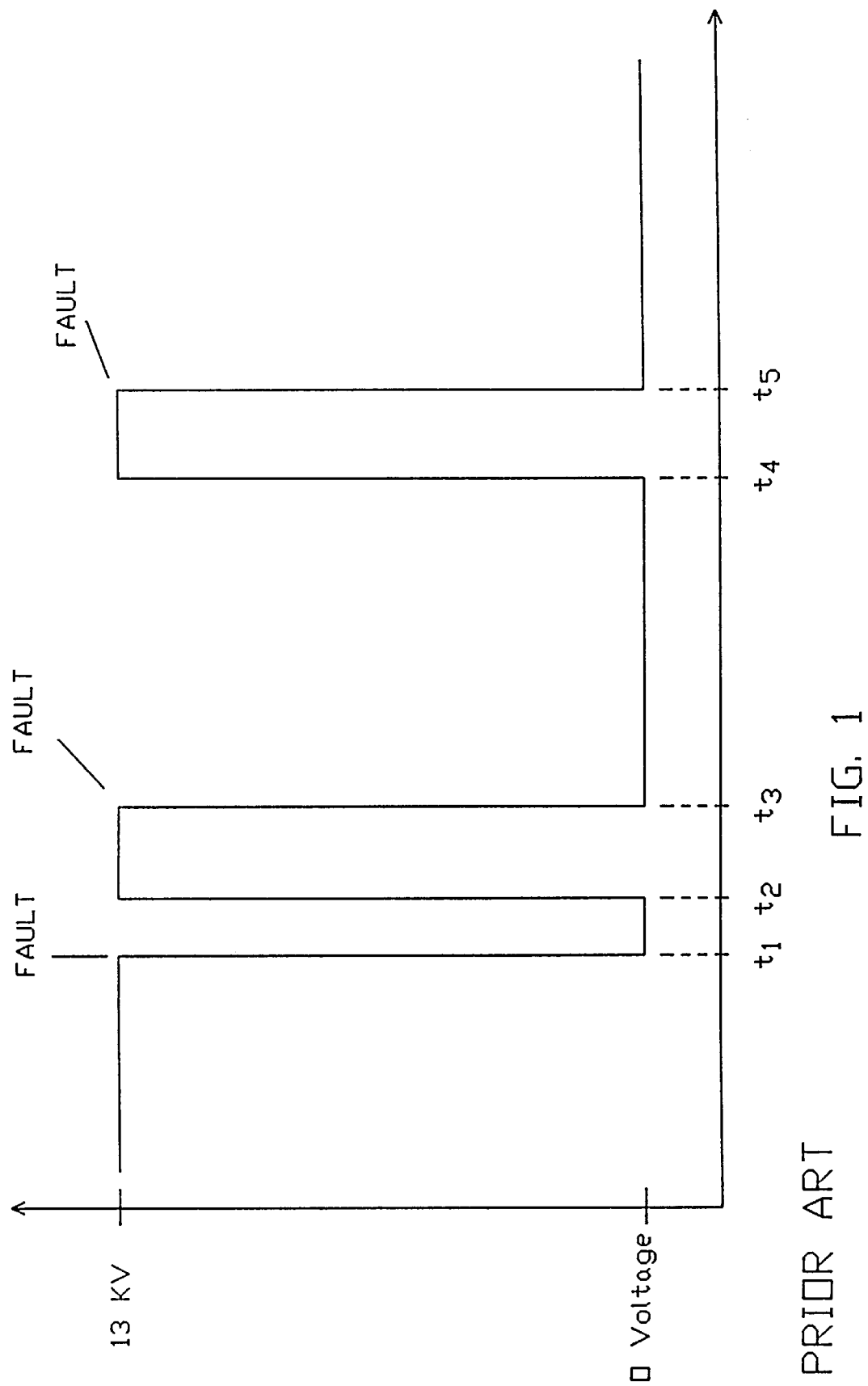
FIG. 1 is a voltage waveform diagram for an electrical power substation circuit breaker responding to an overcurrent.
Figure 2:
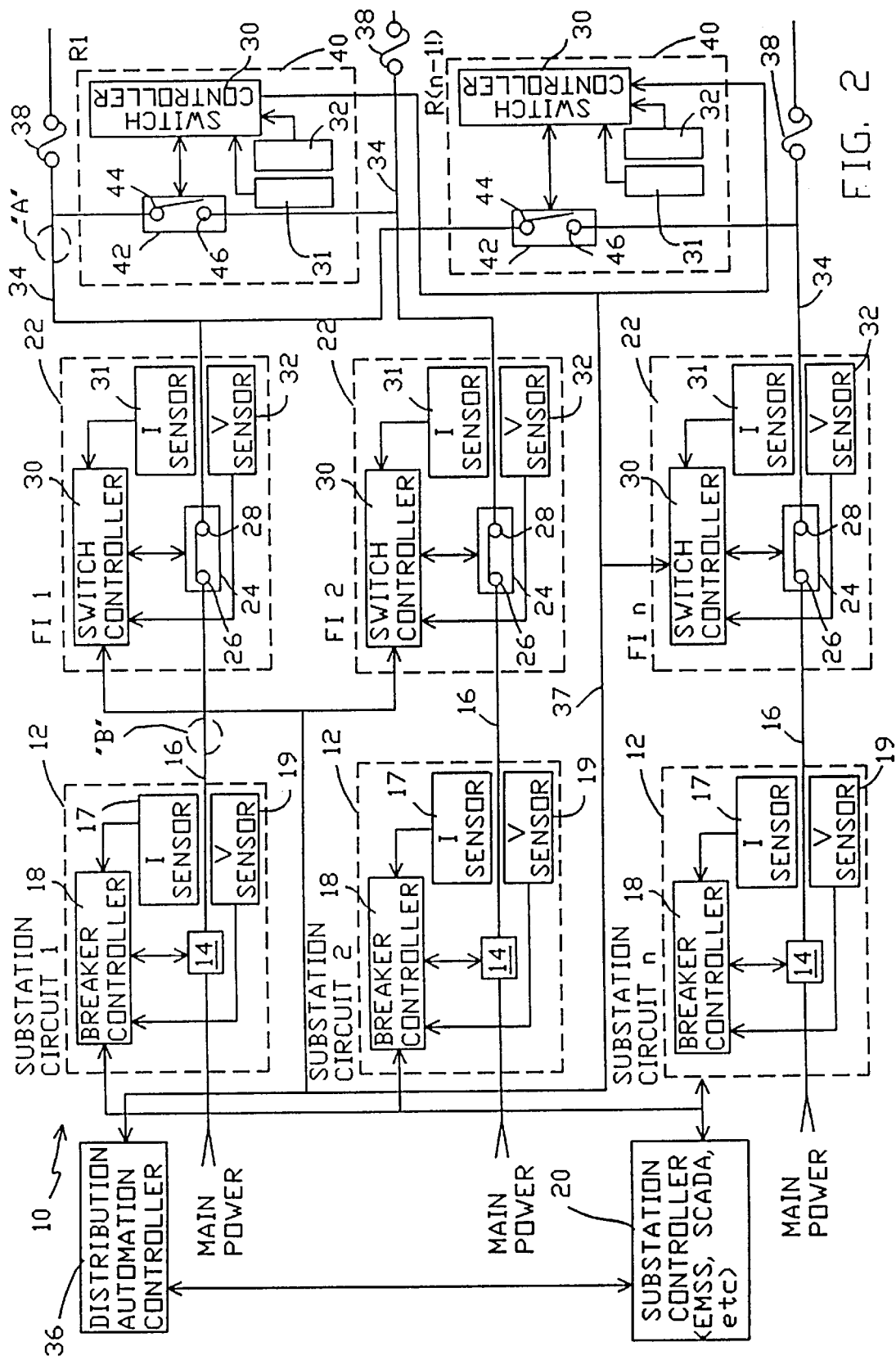
FIG. 2 is a system block diagram for the power distribution system of the present invention, illustrating the connections of fault isolating switch assemblies and restoration switch assemblies within the system.

Referring to FIG. 2, the system 10 of the present invention is configured to operate with numerous substation circuit assemblies 12, which range from between one substation circuit and n substation circuits, where n is the total number of substation circuits. Furthermore, existing power distribution systems comprise numerous substations each having numerous circuits distributed therefrom. As noted, each circuit provides three phase power to residential and industrial locations. Each substation circuit assembly 12 includes a circuit breaker 14, breaker controller 18 (including relays and reclosures), current transformer 17 and potential transformer 19. Breaker 14 is connected to each phase of the three phase main power and to load feeder conductors 16. Preferably, each breaker 14 is a motor controlled breaker which responds to actuation signals from breaker controller 18. Current transformer 17 and potential transformer 19 are operatively connected to breaker controller 18 and load feeder conductors 16 so as to measure the current flowing through the feeder conductors 16 and the voltage across the feeder conductors and a reference point, and transfer such information to the breaker controller 18.

The breaker controller 18 is an interface between the current and potential transformers and the breaker motor (not shown), and is provided to receive the measured current and voltage values from the transformers and to determine, among other functions, whether an overcurrent condition is present. In addition, controller 18 is an interface between the substation circuit assembly 12 and the substation controller 20. Breaker controller 18 provides status information to the substation controller 20. Such status information includes current and voltage values as well as the mode of operation of the substation circuit breaker assembly 12. The substation controller 20 transfers to breaker controller 18 instructional information, e.g., instructions to activate the motor of switch 14. Breaker controllers of the type described above are known in the art and include relays, reclosures, transducers and remote terminal units (RTU). The substation controller 20 is preferably a processor controlled device having memory (e.g., RAM and ROM), stored programs (e.g., system and application programs) as well as data communication capabilities. Such controllers are also known in the art, an example of such is the model XA-21 manufactured by Harris Corporation.

Communication between each breaker controller 18 and the substation controller 20 may be accomplished via known RF or microwave communication devices and techniques or via known fiber optic communication devices and techniques and/or known leased telephone line techniques.

Referring again to FIG. 2, feeder conductors 16 extend from the substation circuit assembly 12 and are connected to fault isolating switch assembly 22 which is in series with the feeder conductors. Preferably, the number of fault isolating switch assemblies 22 utilized in the system of the present invention corresponds to the total number of substation circuits, so that there are between one and n fault isolating switch assemblies. Each fault isolating switch assembly includes a normally closed switch 24 having contacts 26 and 28, a switch controller 30 (e.g., an RTU), a current sensor 31 and a voltage sensor 32. In the embodiment of FIG. 2, switch contact 26 is connected to feeder conductors 16 and switch contact 28 is connected to feeder conductors 34 which extends from the load side of the switch assembly 22 to circuit fuse 38. Normally closed switch 24 is preferably a motor operated switch which responds to actuation signals from switch controller 30. Current sensor 31 and voltage sensor 32 are configured within switch assembly 22 to measure the voltage across each phase of the feeder conductors 34 on the load side of the fault isolating switch assembly. An example of a combination switch 24 and sensors 31 and 32 is the model 148112R-A1C10E3, manufactured by S&C Electric Co. of Chicago, Ill.

Preferably, switch controller 30 is a microprocessor based controller having memory and stored programs (system and application). An example of a suitable controller is the MC68HC11 microprocessor controller, manufactured by Motorola. An example of one function performed by controller 30 is that the controller receives from current sensor 31 and voltage sensor 32 data reflecting the measured values for the current and voltage, and processes the data to determine if an overcurrent condition exists. The measured voltage and current values as well as the overcurrent status information (i.e., an overcurrent has or has not been measured) are then transmitted to distribution station controller 36 via line 37.

Distribution station controller 36 is preferably a microprocessor controlled device having memory (e.g., RAM and ROM), stored programs (e.g., system and application) as well as data communication capabilities. An example of a suitable distribution station controller is the model PC-486, manufactured by Gateway Computer Systems utilizing a RealFlex operating system version 2.15. Communications between the switch controllers 30 and distribution station controller 36 may be accomplished utilizing known RF, microwave or fiber optic communication devices and techniques.

In general, fault isolating switch assembly 22 is provided to prevent current supplied by the substation circuit from flowing beyond a predetermined point along the distribution system, so that in the event an overcurrent condition exists on the load side of the switch assembly, current may still be provided to customers on the line side of the switch assembly. A more detailed description of the operation of switch assembly 22 will be described below.

Figure 3:
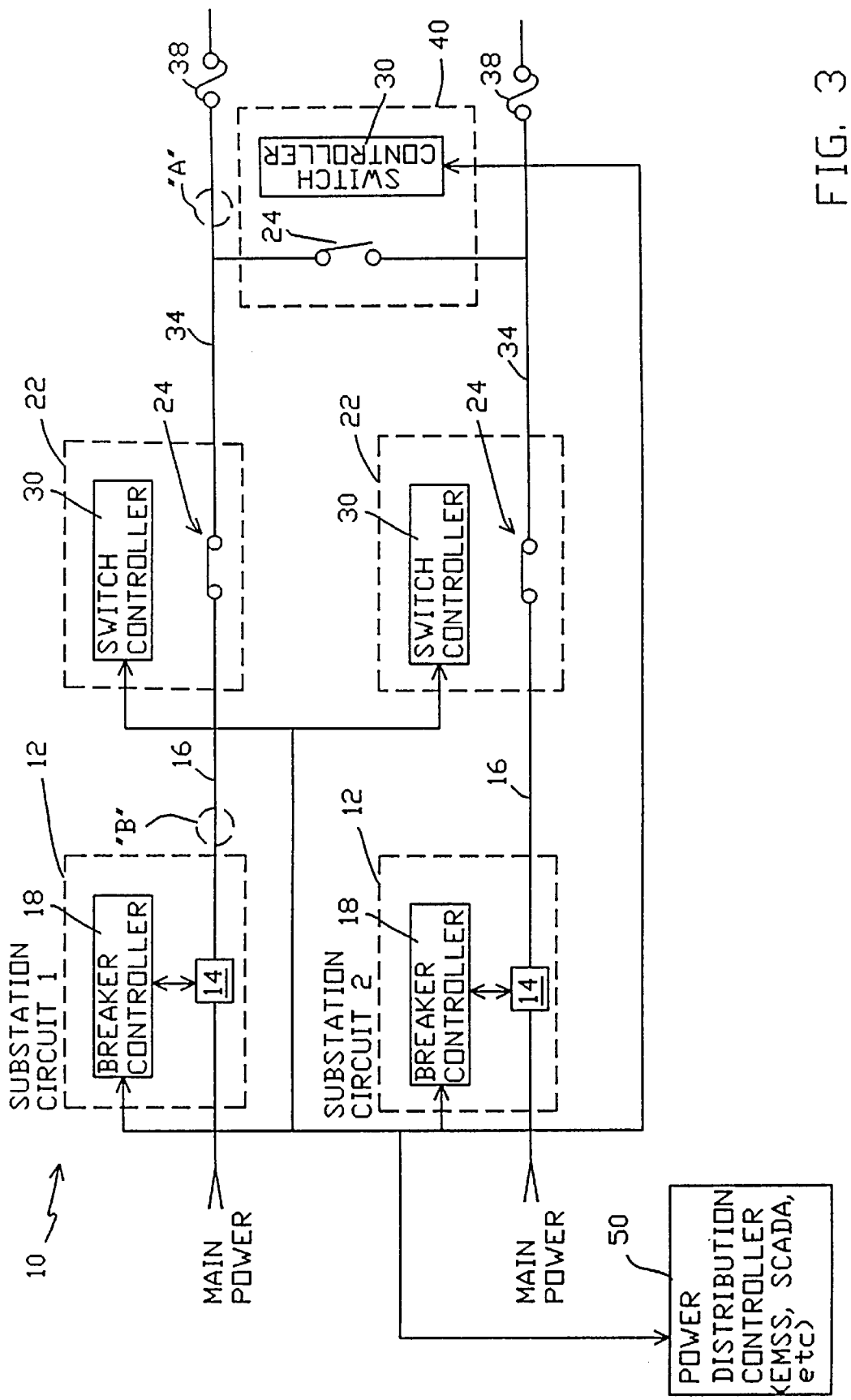
FIG. 3 is a system block diagram for an alternative embodiment for a system configuration of the power distribution system of the present invention.

Referring to FIG. 3, the substation controller 20 and the distribution station controller 36 may be replaced by power distribution controller 50. Similar to each station controller, power distribution controller 50 is preferably a microprocessor controlled device having memory (e.g., RAM and ROM), stored programs (e.g., system and application) as well as data communication capabilities. Power distribution controller 50 is configured to interface with breaker controllers 18 and switch controllers 30 to coordinate operations therebetween in a similar manner as described above with respect to each station controller.

Figure 6B:
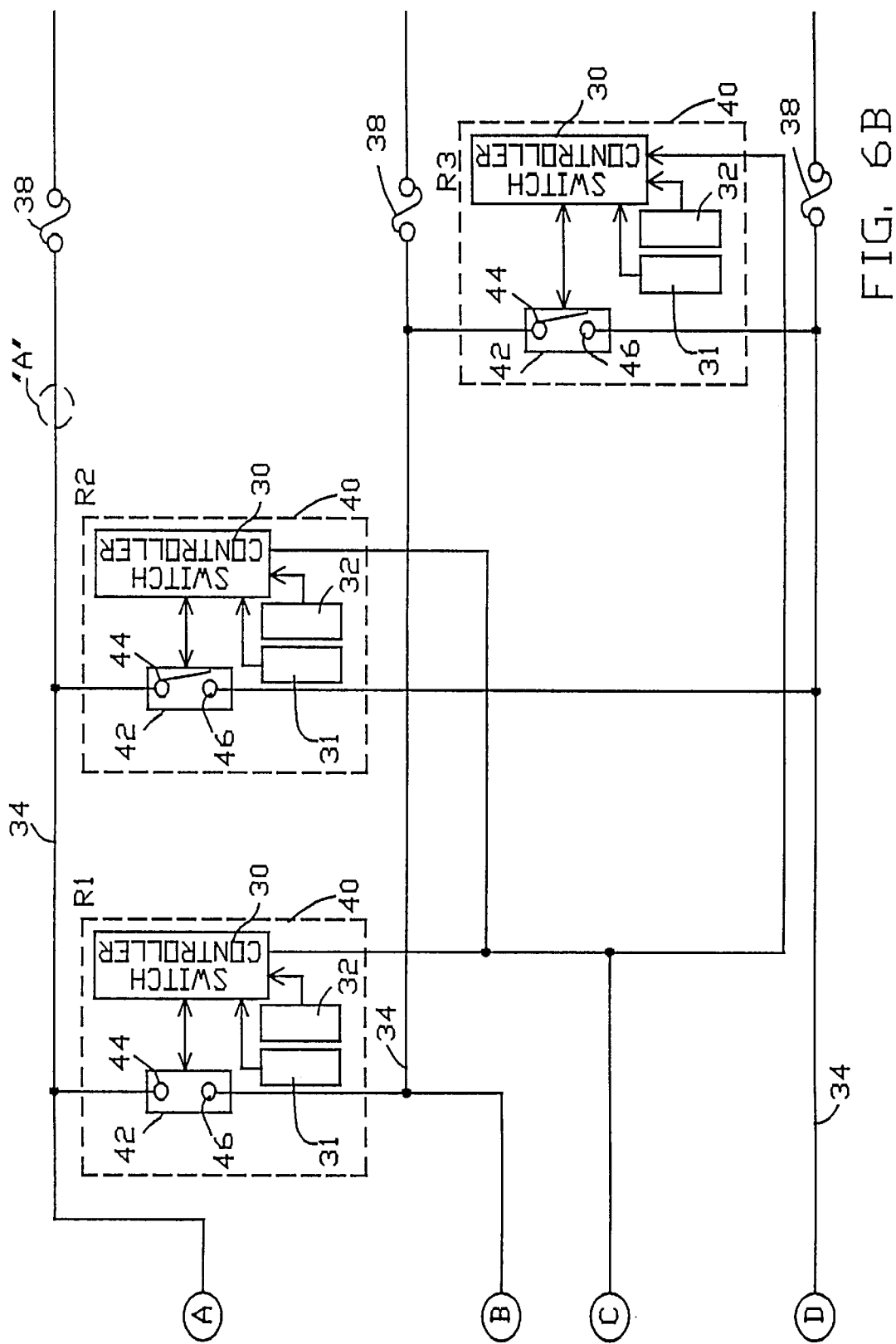
FIG. 6 is a system block diagram for the power distribution system of the present invention similar to FIG. 2 and illustrating one fault isolating switch assembly in the open position and one restoration switch assembly in the closed position.
Figure 7:
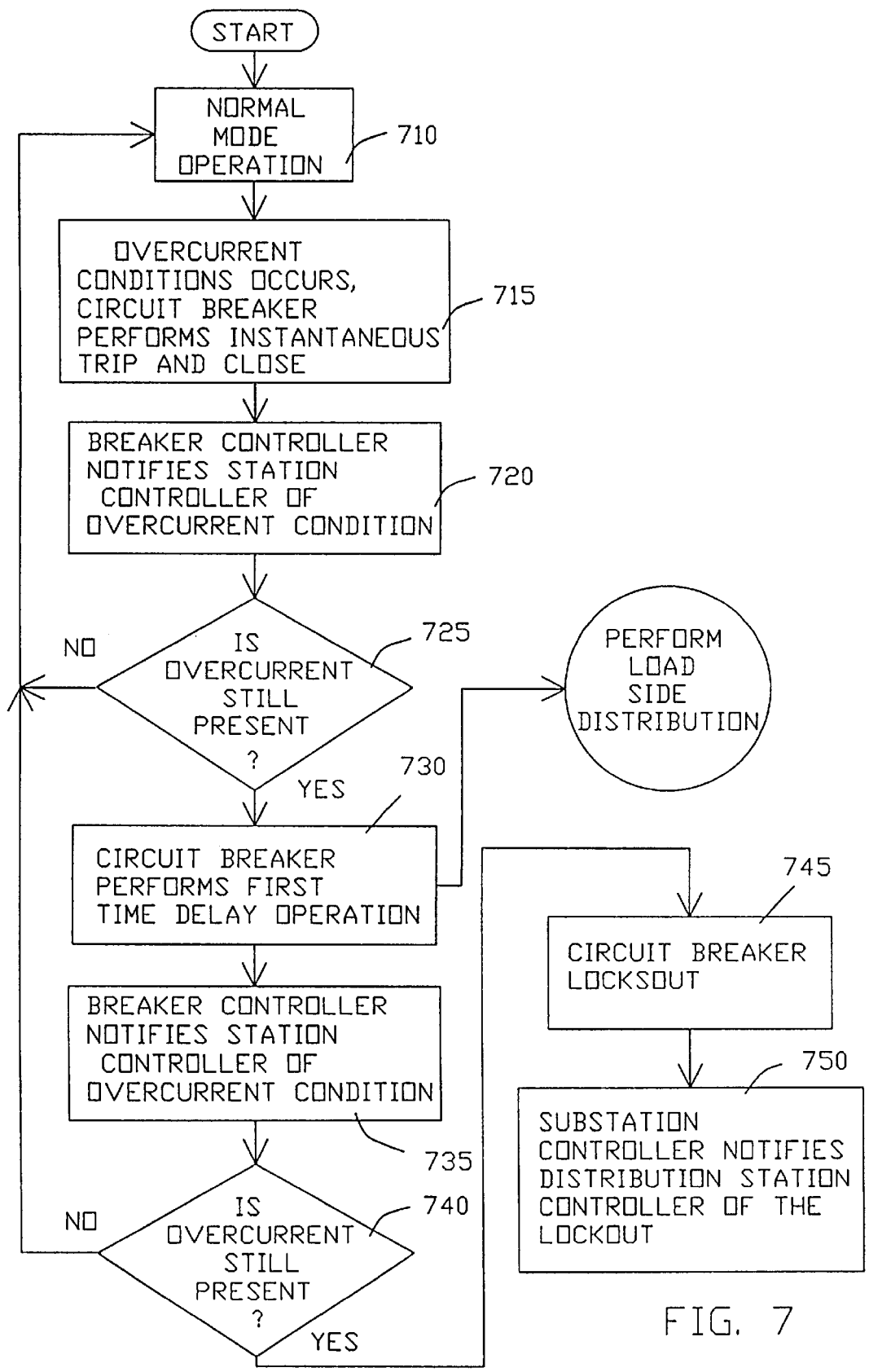

In addition to the fault isolating switch assembly, the present invention provides numerous restoration switch assemblies 40 which are provided to restore power to customers connected to the load side of fault isolating switch assembly 22. Referring again to FIG. 2, the restoration switch assemblies are utilized, for example, when an overcurrent is detected on the line side of the switch assembly 22 at, for example, point "B". Preferably, for each substation circuit one restoration switch assembly 40 is connected on the load side of each fault isolating switch assembly 22 between that substation circuit and the remaining circuits connected to the substation, as shown in FIG. 6. In this configuration, if a fault is detected on the line side of any fault isolation switch assembly 22 any of the remaining substation circuits can supply power to the load side of the switch assembly. Thus, the total number of restoration switches connected within the power distribution system 10 is generally related to the total number of substation circuits (n), i.e., the total number of restoration switches (m) is approximately the factorial of the total number of substation circuits minus one (m=(n−1)!).

Continuing to refer to FIG. 2, each restoration switch assembly is constructed similar to the fault isolating switch assembly 22. The restoration switch assembly includes a switch controller 30 and a normally open switch 42 having switch contacts 44 and 46. Current and voltage sensors 31 and 32 are also provided in the restoration switch assembly 40 to measure current flowing through the switch 42 and the voltage between feeder conductors 34 and a reference point. As can readily be seen in FIG. 2, the difference between switch assembly 22 and switch assembly 40 is that one switch is normally closed and the other switch is normally open.

Figure 4:
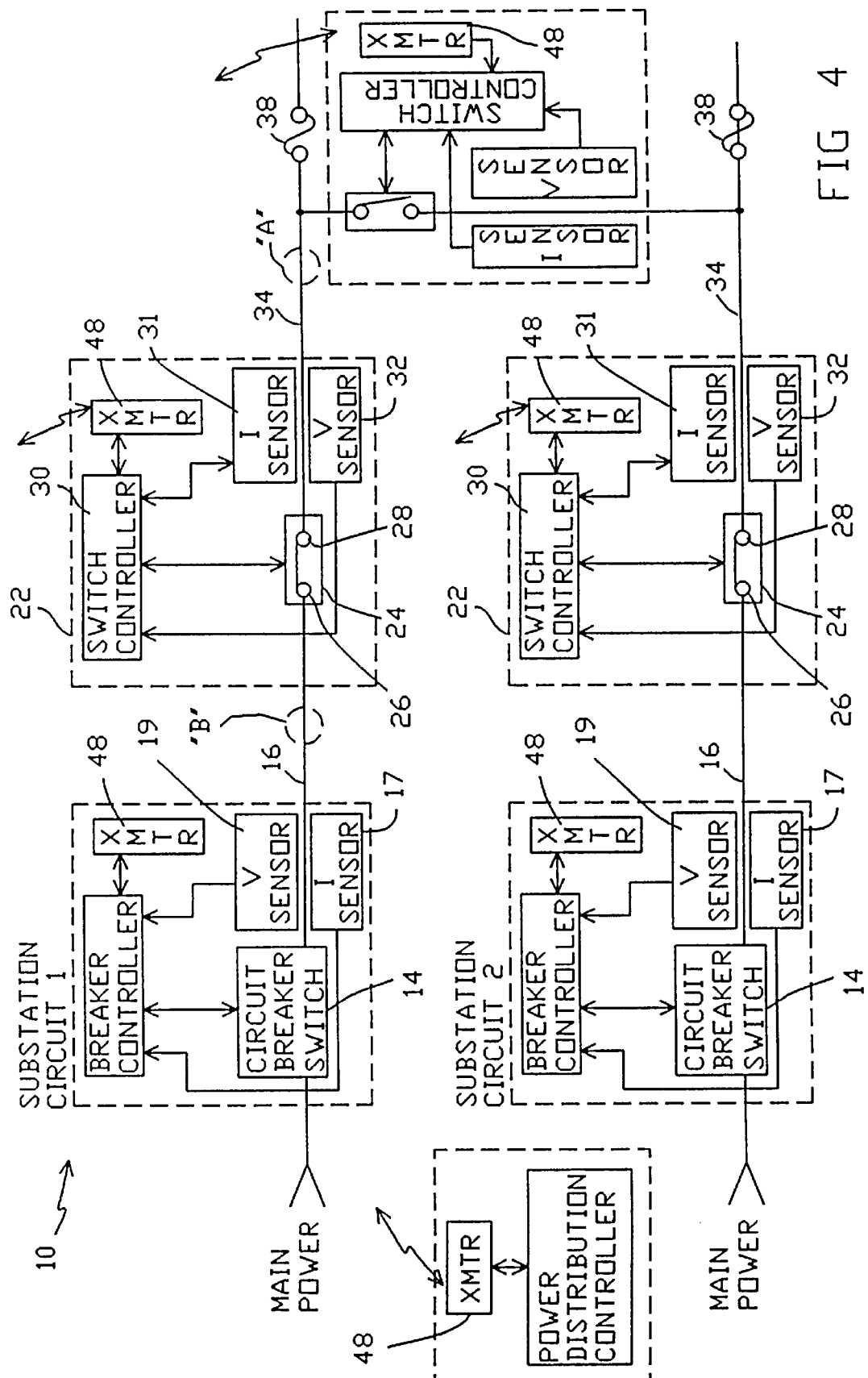
FIG. 4 is another alternative embodiment for the system configuration of the power distribution system of the present invention.
Figure 5:
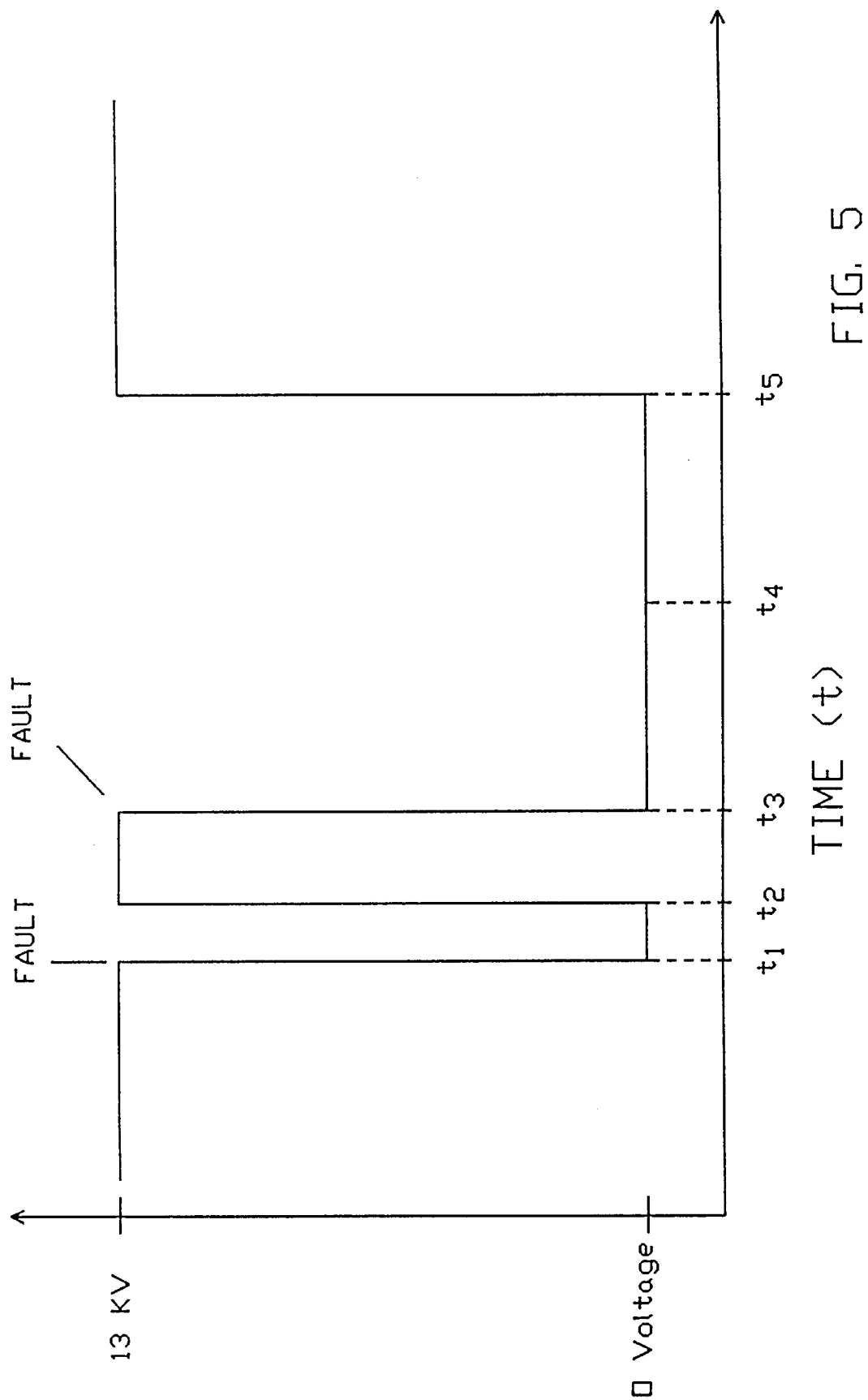
FIG. 5 is a voltage waveform diagram illustrating actuation of the circuit breaker in response to an overcurrent and actuation of the fault isolating switch assembly.

Switch controller 30 of each restoration switch assembly 40 operates is a similar manner as the switch controller for each fault isolating switch assembly 22, and is connected via line 37 to distribution station controller 36. Communication between switch controllers 30 and distribution station controller 36 may be accomplished through fiber optic cables 37 utilizing known devices and transmission techniques or through RF or microwave communications utilizing known transmitters 48 as shown in FIG. 4.

The operation of the system of the present invention will now be described. As noted above, faults may occur on the load side of any fault isolating switch assembly between the switch assembly and an in-line circuit fuse, or on the line side of any fault isolating switch assembly between the substation circuit breaker and the switch assembly. Thus, two operational sequences are utilized wherein each operational sequence depends on which side of the fault isolating switch assembly the fault occurs. The first sequence is defined as the load side distribution which corresponds to a fault detected on the load side of a fault isolating switch assembly. The second sequence is defined as the line side distribution which corresponds to a fault detected on the line side of the fault isolating switch assembly.

The load side distribution will be described with reference to FIGS. 5, 6, 7 and 8. Initially, the system is operating in a normal mode where all the substation circuits are operational (step 710 of FIG. 7). When an overcurrent condition occurs, the circuit assembly 12 at the corresponding substation circuit enters the "instantaneous trip and close" mode (step 715 of FIG. 7). At time $t_1$, shown in FIG. 5, the circuit breaker switch 14 trips and breaker controller 18 will transfer data to station controller 20 reflecting that an overcurrent was detected and that the switch 14 has tripped (step 720). At time $t_2$ breaker controller 18 will actuate the circuit breaker switch motor control to close switch 14 in an attempt to determine if the overcurrent is an instantaneous type of overcurrent or if the cause of the overcurrent can be dislodged, as described above. If the cause of the overcurrent has disappeared, the system will return to the normal operation mode.

If a fault is again detected at time $t_3$, the circuit breaker will again trip and perform the first time delay operation (steps 725 and 730). Circuit breaker controller 18 will transmit data to substation controller 20 that an overcurrent has been detected and that the circuit breaker switch has tripped a second time and is now in the "first time delay" mode. At substantially the same time that the fault is initially detected by circuit breaker assembly 12, switch controller 30 of fault isolating switch assembly (identified as FI1) 22 will record that a overcurrent has been detected by the current sensor 31 in switch assembly 22 (steps 810 of FIG. 8). Thus, it can be determined that the cause of the overcurrent condition has occurred on the load side of switch assembly 22 at, for example, point "A" of FIG. 6.

Thereafter, switch controller 30 monitors the voltage sensor 32 in fault isolating switch assembly 22 to determine whether or not a voltage is present (step 820). If a minimum voltage is present, e.g., 80% of the nominal voltage, then the system returns to the normal operation mode (steps 830 of FIG. 8 and 710 of FIG. 7). If approximately zero voltage (i.e., less than 80% of the nominal voltage) is detected for a programmable time period, e.g., approximately 15 seconds, then the switch controller 30 of fault isolating switch assembly (FI1) 22 instructs the switch 24 to open, shown in FIG. 6 (steps 830 and 840 of FIG. 8). The timing of the opening of switch 24 in the fault isolating switch assembly 22 occurs at approximately time $t_4$, shown in FIG. 5, which is approximately one-half the 30 second first time delay period. As a result, switch 24 is opened when no current is being provided from the substation, thus reducing the need to provide switches which are constructed to withstand the arcing and high temperatures which occurs when opening switches having a high (fault) current flowing therethrough. At time $t_5$ the circuit breaker switch 14 for the substation circuit (identified as substation circuit 1) is closed to restore power in feeder conductors 16. Since the fault is on the load side of switch assembly 22 and switch 24 is open, power will be restored to those customers (or users) connected to the line side of the fault isolating switch assembly (FI1) 22. This same procedure applies to the remaining substation circuits (i.e., substation circuits 2 through n) wherein each fault isolating switch assembly 22 operates in a similar manner as described for substation circuit 1.

The line side distribution will now be described with reference again to FIGS. 1, 6, 7 and 9. Initially, the system is operating in a normal mode where all the substation circuits are operational (step 710 of FIG. 7). If a fault occurs at point "B", shown in FIG. 6, the circuit breaker assembly 12 associated with substation circuit 1 trips at time $t_1$ and closes at time $t_2$ in a manner as described above (i.e., the "instantaneous trip and close" mode) (steps 715 and 720). If the cause of the overcurrent has disappeared, the system will return to the normal operation mode. If a fault is still detected at time $t_3$ the circuit breaker assembly will again trip and enter the "first time delay" mode as described above (steps 725 and 730). Once in the "first time delay" mode, breaker controller 18 transmits information to substation controller 20 reflecting that the circuit breaker assembly has detected an overcurrent and that the assembly is in the "first time delay" mode (step 735). At time $t_5$, the end of the "first time delay" mode, the circuit breaker assembly will close and if the overcurrent is still present the circuit breaker assembly will again trip and enter the lockout mode (steps 740 and 745).

Once the circuit breaker assembly is in the lockout mode, the substation controller 20 then sends information to distribution station controller 36 that the breaker 14 has opened due to an overcurrent (step 750). Distribution station controller 36 then receives from the switch controller 30 of the isolating switch assembly associated with the faulty substation circuit, voltage and current information (step 910 of FIG. 9). In this instance, the voltage information will reflect that voltage sensor 32 has measured less than 80% of the nominal voltage and that current sensor 31 has not measured an overcurrent. This information enables the distribution controller 36 to determine that the overcurrent has occurred on the line side of the fault isolating switch assembly (FI1) 22. To restore power to customers on the load side of the fault isolating switch assembly, distribution controller 36 transfers information to the switch controller 30 of the fault isolating switch assembly within the faulty circuit, to open switch 24 (step 920). Distribution controller 36 also transfers information to actuate one of the restoration switch assemblies 40.

Prior to actuating one of the restoration switch assemblies, distribution controller 36 initially retrieves from memory, data associated with each substation circuit load and the amount of current required by that load. In addition, controller 20 also retrieves the load data associated with the load on the load side of fault isolating switch assembly 22 of the faulty circuit and the current requirements for that load portion (step 930).

Once the distribution controller 36 retrieves the load data and current requirements, the controller then determines which substation circuit can accommodate the additional load from the faulty circuit (step 940) and then instructs the switch controller 30 to close the restoration switch assembly connected between the two substation circuits (step 950). To illustrate, if substation circuit 2 is configured to supply 250 amps of current and the existing load of circuit 2 is rated to draw 150 amps, and if the load on substation circuit 1 on the load side of fault isolating switch assembly 22 is rated to draw 75 amps, then substation circuit 2 would have sufficient current capability to supply the entire load (i.e., the existing load and the additional load). In this instance, distribution controller 36 will send control information to switch controller 30 to actuate (i.e., close) restoration switch assembly (R1) 40 as shown in FIG. 6. Thus, power is restored to customers connected to the load side of fault isolating switch assembly (FI1) 22.

It will be understood that various modifications can be made to the embodiments of the present invention herein disclosed without departing from the spirit and scope thereof. Therefore, the above description should not be construed as limiting the invention but merely as exemplifications of preferred embodiments thereof. Those skilled in the art will envision other modifications within the scope and spirit of the present invention as defined by the claims appended hereto.

What is claimed is:

1. Apparatus for distributing electrical power from power substation circuits wherein each substation circuit includes feeder conductors and a circuit breaker assembly located at said substation configured to open when current flowing through the conductors exceeds a predetermined value, said apparatus comprising:

at least one fault isolating switch member positionable in series with the feeder conductors of each substation circuit so as to define a line side and a load side, said at least one isolating switch member having current sensing means operatively associated therewith for measuring current values on said load side of said isolating switch member; and means associated with said at least one isolating switch member for determining if said measured current value exceeds a predetermined value and for selectively actuating said at least one isolating switch member when said predetermined value is exceeded, said isolating switch actuating means having a predetermined time delay before actuating said at least one isolating switch member, such that said time delay corresponds with the opening of the substation circuit breaker assembly.

* * * * *